UNITED STATES PATENT OFFICE.

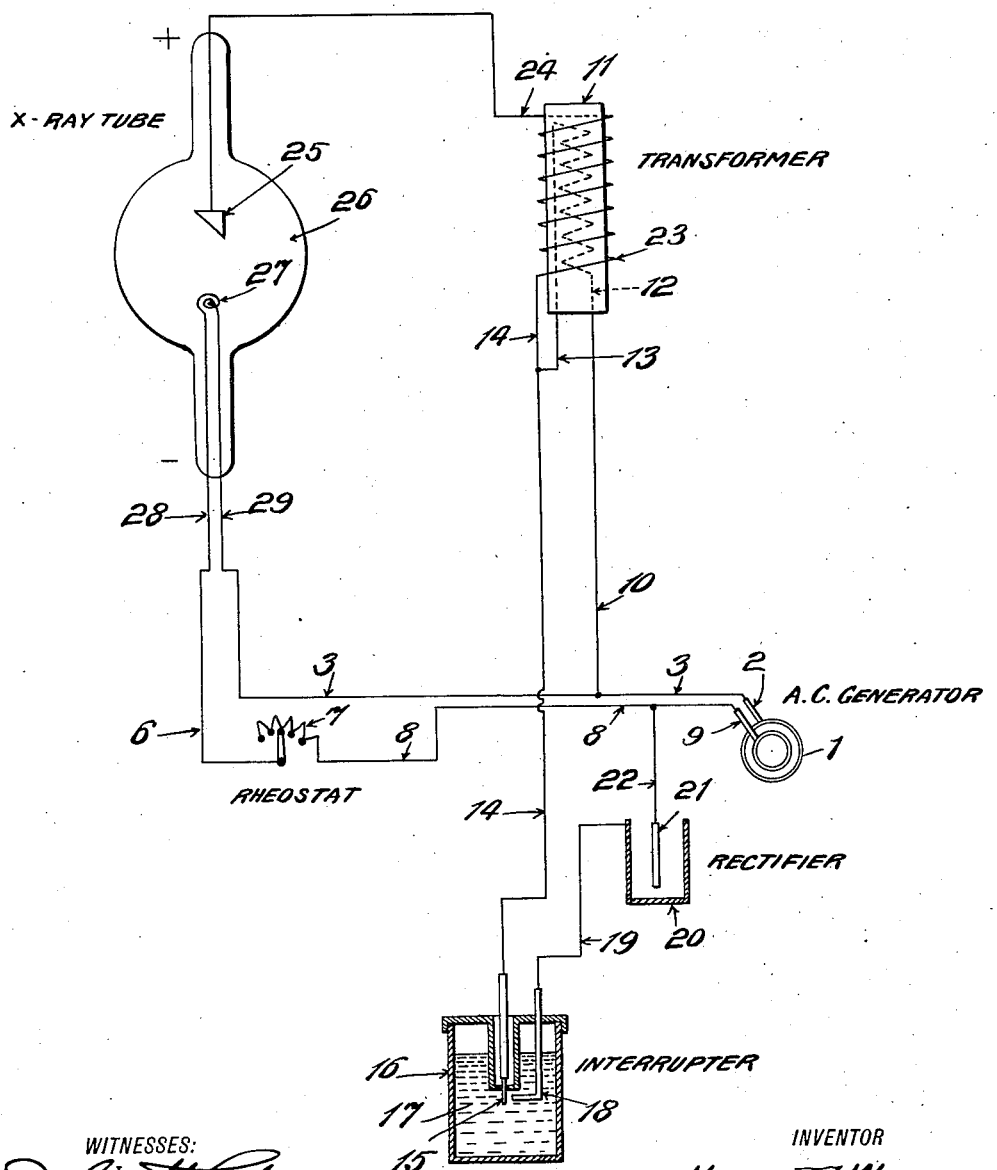

HARRY F. WAITE, OF NEW YORK, N. Y.

X-RAY SYSTEM.

1,246,508.      Specification of Letters Patent.      Patented Nov. 13, 1917.

Application filed July 11, 1916. Serial No. 108,601.

*To all whom it may concern:*

Be it known that I, HARRY F. WAITE, a citizen of the United States, and a resident of Whitestone Landing, county of Queens, city and State of New York, have invented a new and useful Improvement in X-Ray Systems, of which the following is a specification.

The object of my invention is to provide a simple and efficient X-ray system which will have few or no rotating parts, and which will be reliable and suitable for dental use, or any other use where a substantial uniformity of X-ray generation is desired. This object is accomplished by my invention, one embodiment of which is hereinafter more particularly set forth.

For a more particular description of my invention, reference is to be had to the accompanying drawing in which is shown a diagram of my improved system.

In the embodiment of my invention herein shown, an alternating current system is employed. Where a direct current is used there must be an interrupter employed, as will appear below.

For convenience 1 indicates an alternating current generator which generates an alternating current that leaves the brushes of the machine in the conventional manner to pass through several circuits which will now be described. Beginning with the brush 2, one circuit is completed through a wire 3 which runs to a cathode lead 29 connected to a cathode 27 which has a second lead running to a wire 6 which runs to a rheostat 7, or other regulating device, and this rheostat is connected to a wire 8, which runs back to the other brush 9 of the alternator thereby completing one of the circuits.

This rheostat 7 enables the operator to manually control the heating of the cathode 27 at all times from the low tension circuit.

Another low tension circuit is through a wire 10 that runs to the primary of a small transformer 11, and this primary 12 is also connected to a wire 13 and runs to a wire 14, which is connected to the platinum electrode 15 of an interrupter 16, this interrupter being of the conventional kind, and provided with a suitable acid or alkali solution 17 in which this electrode is immersed at its lower end. The lead electrode 18 is also immersed in this acid solution 17 to form the other electrode of the interrupter, and this electrode 18 runs to a wire 19 which is connected to the aluminum cell rectifier 20, in the conventional way. The inner electrode 21 of this cell 20 is connected by a wire 22 to the wire 8, as shown. This completes a second circuit.

A third, or high tension circuit begins with the wire or conductor 14 which runs to the negative pole of the secondary 23 of the transformer 11, and this secondary winding has its other or positive lead 24 which runs to the positive electrode or anode 25 of an X-ray tube 26. The cathode 27 of the tube 26 is preferably a coil of tungsten or similar material, connected to two lead wires 28 and 29 respectively, as above described, in the conventional manner.

In view of what has been said the high tension circuit will now be traced. Beginning with the negative pole at the wire 14 this circuit runs through the coil 23, thence out through the positive lead 24 to the anode 25, thence across the vacuum in the tube 26 to the cathode 27, and thence down the wire 29 to the wire 3, then the wire 10 through the primary 12 of the transformer 11 to the wire 14, through the wire 13.

The foregoing description applies to an alternating current system. If a direct current system is employed so that the wires 3 and 8 are provided with a direct current, it is necessary that an interrupter be put in circuit in the wire 8 so that the transformer 11 may be made operative.

In view of the foregoing, the operation of my improved system will be readily understood. Assuming the connections to be as shown, it is apparent that the current passing through the wires 3 and 8 will energize the filament 27 and cause the same to be heated through the wires 28 and 29, this heating being manually controlled by the rheostat 7, or otherwise, as desired. At the same time the transformer 11 is energized by a current passing through the wire 3 to the wire 10 into the primary 12, thence out through the wire 13 to the wire 14 and thence through the interrupter to the wire 19 and to the rectifier, and then to the wire 22 to the wire 9 to the generator 1. This current flows in one direction only due to the rectifier, and when it reaches its maximum, a point determined by the immersion of the point 15, an interruption occurs. The effect of the interruption is to abruptly terminate the current at its maximum. This abrupt interruption of the current will induce a high tension current in the secondary 23 of the transformer 11 which current will pass through the anode 25 and cathode 27 of the tube 26, and thence along the wire 29 to the wire 3, and thence along the wire 10 through the primary 12 of the transformer 11, back to the wire 14 through the wire 13. Only a portion of the energy received is utilized, but as enough is utilized to energize the tube, this is sufficient.

While I have shown and described one embodiment of my invention, it is obvious that it is not restricted thereto but is broad enough to cover all structures that come within the scope of the annexed claims.

Having thus described my invention, what I claim is:

1. In a system of the class described, a step-up transformer with a low tension circuit and a high tension circuit, an interrupter and rectifier in the low tension circuit, an X-ray tube in the high tension circuit, and a conductor connecting the negative pole of the high tension circuit with the low tension circuit.

2. In a system of the class described, a step-up transformer with a low tension circuit and a high tension circuit, an interrupter in the low tension circuit, an X-ray tube in the high tension circuit, means for heating the cathode of the X-ray tube from the low tension circuit, and a conductor connecting the negative pole of the high tension circuit with the low tension circuit.

HARRY F. WAITE.